(12) United States Patent
Kall et al.

(10) Patent No.: US 7,149,195 B2
(45) Date of Patent: Dec. 12, 2006

(54) APPARATUS, AND ASSOCIATED METHOD, FOR MULTICASTING DATA IN A RADIO COMMUNICATIONS SYSTEM

(75) Inventors: Jan Kall, Espoo (FI); Patrik Flykt, Helsinki (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 09/998,461

(22) Filed: Nov. 29, 2001

(65) Prior Publication Data

US 2003/0043786 A1 Mar. 6, 2003

Related U.S. Application Data

(60) Provisional application No. 60/315,750, filed on Aug. 28, 2001.

(51) Int. Cl.
*H04Q 7/00* (2006.01)
(52) U.S. Cl. .................. 370/328; 370/342; 370/352; 370/389; 455/3.02
(58) Field of Classification Search ............ 370/328, 370/352, 331, 337, 338, 342, 381, 389; 455/3.02; 713/163
See application file for complete search history.

(56) References Cited

U.S. PATENT DOCUMENTS

| 6,418,141 | B1 | 7/2002 | Votava |
| 6,434,117 | B1 | 8/2002 | Momona |
| 2001/0043601 | A1 | 11/2001 | Yamano |
| 2002/0001310 | A1 | 1/2002 | Mai et al. |
| 2002/0143951 | A1 | 10/2002 | Khan et al. |
| 2003/0033394 | A1* | 2/2003 | Stine .................. 709/222 |
| 2005/0186959 | A1* | 8/2005 | Vialen et al. ............ 455/432.1 |
| 2005/0227695 | A1* | 10/2005 | Rasanen et al. ........... 455/436 |

* cited by examiner

*Primary Examiner*—John Pezzlo
*Assistant Examiner*—Inder Pal Mehra
(74) *Attorney, Agent, or Firm*—Robert M. Bauer; Lackenbach Siegel, LLP

(57) ABSTRACT

Apparatus, and an associated method, for facilitating formation of a RANcast in a radio communication system. An identifier identifies when a selected number of mobile user endpoints within a cell of a radio communication system are to receive the same multicast data. When the number exceeds a selected threshold, a RANcast is implemented by a RANcast implementer in which a common channel is used to broadcast the multicast data to all the mobile user endpoints.

16 Claims, 6 Drawing Sheets

APPARATUS, AND ASSOCIATED METHOD, FOR MULTICASTING DATA IN A RADIO COMMUNICATIONS SYSTEM

CROSS-REFERENCE TO RELATED APPLICATIONS

The present invention claims the priority of provisional patent Application No. 60/315,750, filed on Aug. 28, 2001.

The present invention relates generally to a manner by which to send multicast data to mobile user endpoints in a radio communication system. More particularly, the present invention relates to apparatus, and an associated method, by which selectably to broadcast the multicast data as a RANcast (Radio Access Network-cast) upon a common channel. By broadcasting the multicast data as a RANcast upon the common channel, radio resources in the radio communication system are efficiently utilized. Separate unicasts of the data to each of the mobile user endpoints are selectably obviated, thereby reducing the bandwidth required to effectuate the communication of the multicast data pursuant to the RANcast, as contrasted to conventional unicasts of the data.

BACKGROUND OF THE INVENTION

The development, and implementation, of various types of mobile communication systems have been made possible as a result of advancements in communication technologies. A cellular communication system is exemplary of a mobile communication system whose development, and implementation, has been made possible as a result of such advancements in communication technologies.

Telephonic communication of both voice and data is generally permitted by way of a cellular communication system. Other mobile communication systems analogously also provide for the communication of both voice and data.

A radio transceiver, sometimes referred to as a mobile station, is utilized by a user to communicate telephonically therethrough. The radio transceiver, alone, or together with other apparatus, forms a mobile user endpoint for the communication of the information forming the voice and data. Through the use of radio transceivers through which to communicate, wirelines conventionally required in conventional communication systems upon which to define communication channels are obviated. Increased mobility of communications through use of a cellular, radio, or other mobile, communication system is inherently provided.

Advancements in communication technologies include advancements in digital communication techniques. Through the use of digital communication techniques, improved efficiency of communication of the data is possible. For example, through the use of digital communication techniques, the amount of bandwidth required to effectuate the communication of a given amount of data can be reduced. The efficiency of the communication of the data is measured, in part, by the bandwidth required of a communication channel upon which to effectuate the communication of the data. By reducing the bandwidth required to effectuate the communication of the data, the bandwidth available to a communication system can be used to effectuate increased amounts of data. Because of the particular need in a cellular, or other radio, communication system to efficiently utilize the portion of the electromagnetic spectrum allocated thereto, the use of digital communication techniques is particularly advantageously implemented therein.

Information that is to be communicated is first digitized when digital communication techniques are used. Standard protocol schemes have been promulgated, and the data, once digitized, is formatted pursuant to such standardized protocol schemes to facilitate communication of the data during operation of the communication system in which the digital communication techniques are utilized. The internet protocol (IP) is an exemplary standardized protocol by which digitized data is formatted. When the internet protocol is used, the data is formatted into packets, and the packets are communicated to effectuate the communication. Individual ones, or groups, of the packets of data can be communicated at discrete intervals. And, once communicated, the packets can be concatenated together to recreate the informational content contained therein.

While cellular communication systems, referred to as first-generation (1G) systems, utilize conventional analog communication techniques, more-recently implemented cellular communication systems utilize digital communication techniques. So-called second-generation (2G), cellular communication systems have been installed over significant geographical areas. The second-generation systems have been constructed pursuant to various, sometimes competing, communication schemes. Next-generation, cellular communication systems, referred to as third-generation (3G), have been proposed and standards are being promulgated to define operational parameters therein. Third-generation, cellular communication systems also utilize digital communication techniques. And subsequent-generation, such as fourth-generation (4G), systems are, and shall likely continue to be, developed.

New communication services, not implementable as a practical matter, in first-generation, cellular communication systems, are implementable in second- and third-generation systems. For instance, multicast and broadcast communication services are implementable in these newer communication systems. Here the Broadcast communication service is defined to be a downlink only service which may be received by all mobile stations in the coverage area of the broadcast transmission, whilst the Multicast communication service is defined such that only a specific subset of the mobile stations in the coverage area of the Multicast transmission are able to receive the Multciast transmission. In a multicast or broadcast communication service, the same multicast data is anyhow communicated to a plurality of mobile user endpoints.

Existing manners by which to effectuate the multicast or broadcast service, however, require significant amounts of radio resources to be allocated for the effectuation of the communication service with each of the plurality of mobile user endpoints. For instance, in a GSM (Global System for Mobile communications) system in which SMS (Short Message Service) is implemented, broadcast services are standardized using an SMS cell broadcast server. The server is connected to a radio network controller (RNC) in UMTS, or a Base Station Controller (BSC) in GSM as defined in the corresponding communication system directly by way of an $I_{uCB}$ interface. And, multicasting of IP-formatted data can be supported in a GSM system in which GPRS (General Packet Radio Service) is deployed.

However, a separate PDP (Packet Data Protocol) context must be created between each mobile user endpoint and GGSN (Gateway GPRS Service Node) defined in the GSM/UMTS system. When a separate PDP context is set up, every IP multicast receiver, i.e., every mobile user endpoint receiving the multicast data, occupies a separate radio channel. The existing need to allocate a separate radio channel for each mobile user endpoint, even though all of the mobile user endpoints are to receive the same multicast data, is bandwidth-consumptive and the channel allocation requirements potentially limit the number of mobile user endpoints that can receive the multicast data.

A more efficient manner by which to communicate the same data to a plurality of mobile user endpoints would facilitate the effectuation of multicast and broadcast communication services.

It is in light of this background information related to the communication of multicast data in a radio communication system that the significant improvements of the present invention have evolved.

SUMMARY OF THE INVENTION

The present invention, accordingly, advantageously provides apparatus, and an associated method, by which to broadcast or multicast data to mobile user endpoints in a radio communication system.

Through operation of an embodiment of the present invention, a manner is provided by which to broadcast or selectably multicast data as a RANcast (Radio Access Network-cast) upon a common channel, which may be received and shared by several receivers. This new mechansim enables improved and efficient utilization of Radio resources in the radio communication system.

RANcast may be seen as a carrier mechanism, or Bearer, to carry multicast or broadcast data. The existing need otherwise to perform separate unicasts of the data to each of the mobile user endpoints is obviated. Through use of a common shared channel rather than separate unicasts upon separate channels, the bandwidth required to effectuate the communication of the RANcast data is reduced. As the RANcast data is communicated upon a common channel, the need to allocate separate channels for the unicast of data, and the associated overhead signaling to effectuate the formation of the separate channels is also obviated.

In one aspect of the present invention, a RANcast (Radio Access Network-cast) is provided for communication upon a common channel defined in a cell of a packet radio communication system. The packet radio communication system is, for instance, a UMTS (Universal Mobile Telephonic System) defined pursuant to an appropriate third-generation cellular communication standard. The packet radio communication system alternately forms an existing second-generation, packet-based radio communication system, such as a GSM system in which SMS or GPRS is deployed. By broadcasting or selectably multicasting data as a RANcast upon a common channel within a cell, efficient utilization of limited radio resources upon which to communicate the broadcast or multicast data is provided. The need otherwise to allocate separate channels for separate unicasts of the data is obviated.

In another aspect of the present invention, additional functionality is provided to a radio network controller (RNC) of the radio access network (RAN) of the packet-based radio communication system. The additional functionality operates to determine when a RANcast should be implemented within a cell defined by the radio access network. And, once a RANcast is selected to be implemented, a RANcast implementer operates to implement the RANcast upon a common channel throughout the cell in which the RANcast is to be used to effectuate the multicast, or other broadcast, of the data.

In another aspect of the present invention, the offered RANcast and the corresponding broadcast or multicast session are identified with specific identifiers. Normally in the IP network, the IP multicast is identified with the IP multicast address. Other types of Broadcast or Multicast sessions may be identified by other specific identifiers. According to this invention the offered RANcast session is identified by a specific RANcast identifier (RCID) and there is a one-to-one relationship between the RCID and the corresponding broadcast session or multicast session. Using RCID a radio network controller (or base station controller) calculates the number of mobile stations that have requested (registered with) the specific broadcast or multicast service in one or several cells of the cells defined in the radio access network of which the radio network controller controls. Or, the calculation identifies a likely number of mobile stations which shall be receiving the broadcast or multicast data. When the number of mobile stations within a particular cell exceeds a threshold number, a RANcast is implemented in that cell. Thereby, on a cell-by-cell basis, the RANcast is selectably implemented. When the number of mobile stations within a particular cell is reduced beneath a selected level, the RANcast, if appropriate, is terminated and unicasts of the data are instead implemented to effectuate the broadcast of the multicast data to the appropriate mobile stations.

In these and other aspects, therefore, apparatus, and an associated method, is provided for a packet-based, multi-user radio communication system. A data source originates broadcast or multicast data. A radio access network part of the radio communication system is used selectably to facilitate communication of the data to a first mobile user endpoint and at least a second mobile user endpoint. The RNC identifies that communication of the multicast data is to be effectuated upon a common channel. The common channel is common to both the first mobile user endpoint and the second mobile user endpoint. A RANcast implementer is coupled to the RNC. The RANcast implementer implements a RANcast of the multicast data upon the common channel to the first and at least second mobile stations when the RNC identifies that the communication of the multicast data is to be effectuated upon the common channel.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
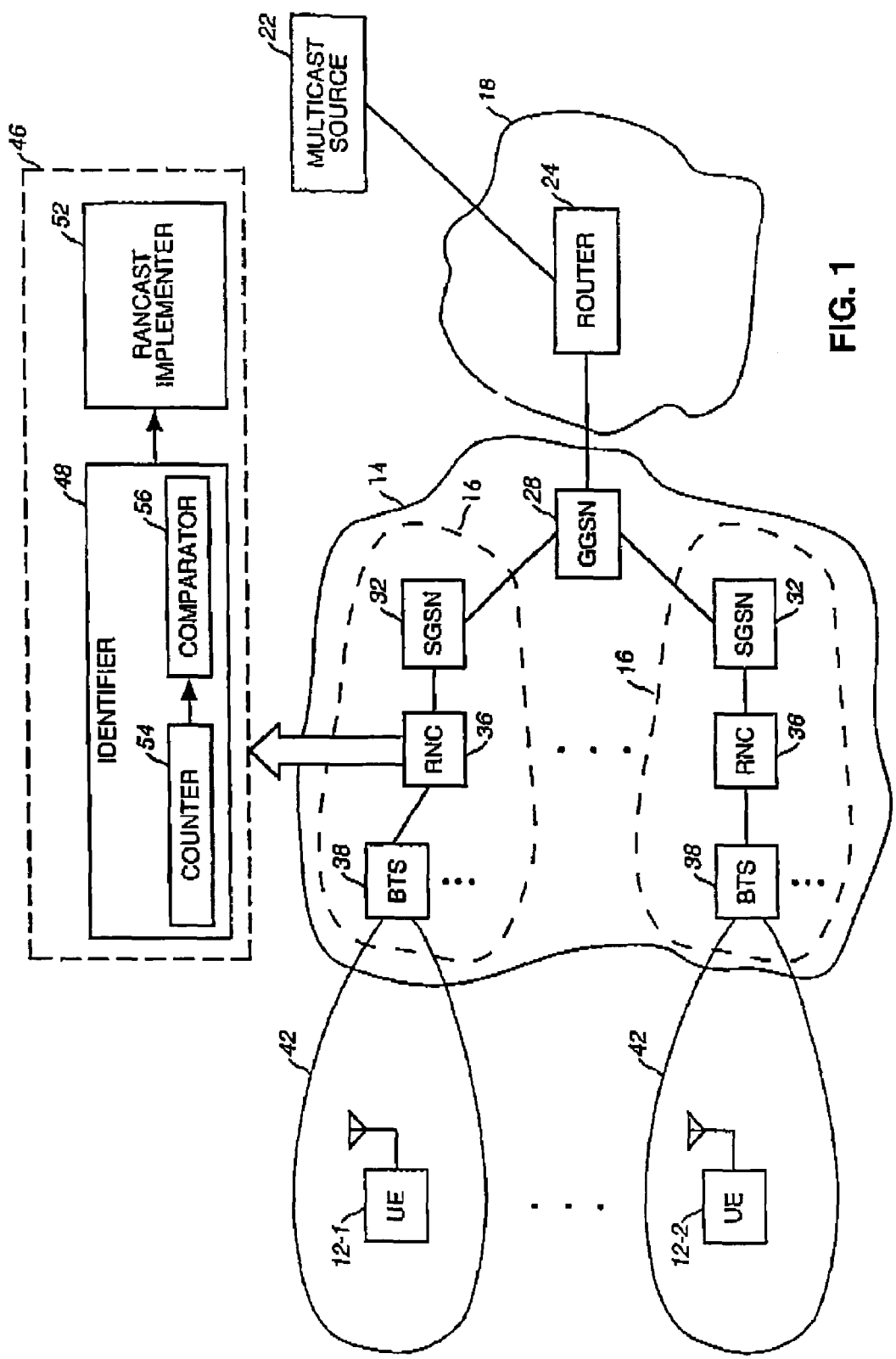
FIG. 1 illustrates a functional block diagram of a packet-based, radio communication system in which an embodiment of the present invention is operable.

Referring first to FIG. 1, a packet radio communication system, shown generally—as 10, provides for packet radio communications with mobile user endpoints 12. The communication system 10 includes a radio part that, in the exemplary implementation shown in the figures, is operable generally pursuant to a third-generation (3G) UMTS (Universal Mobile Telephone Service) communication standard. The implementation of the radio part of the communication system as a UMTS, however, is merely exemplary. The radio part of the communication system is also representative of other types of packet-based radio networks, such as a second-generation GSM (Global System for Mobile communications) system which provides for SMS (Short Message Service) or GPRS (General Packet Radio Service).

The radio part of the communication system 10 includes a radio network part 14, here formed of a plurality of radio access networks (RANs) 16. And, the radio network part is connected to a packet data backbone, here the Internet, 18. A multicast data source 22, such as a data server, is coupled to the packet data network. The multicast source is representative of a data source from which data can be requested by any of the mobile user endpoints 12 to be downloaded thereto. Data originated at, or to be terminated at, the multicast source is routed by way of a network router 24. The radio network part is connected to the packet data network by way of a GGSN (Gateway GPRS Service Node) 28. The GGSN is, in turn, coupled to a plurality of SGSNs (Serving GPRS Service Nodes) 32 associated with a plurality of radio access networks 34.

Each of the radio access networks includes a radio network controller 36, here represented as being positioned in line with the SGSNs of the respective radio access networks. The radio network controllers are operable to control various communications in, and through, the respective radio access networks. The radio access networks also include a plurality of base transceiver stations (BTSs) 38. And, each base station defines a coverage area, i.e., a cell 42. When a mobile user endpoint is positioned within a cell 42, the mobile user endpoint is generally able to communicate with the base station which defines such cell. As a mobile user endpoint travels through successive cells of a radio access network, or between cells of adjacent radio access networks, handoffs of communication are effectuated to permit continued communications with the mobile user endpoints. Pursuant to a communication service, for instance, a broadcast of multicast data is downloaded to the mobile user endpoint.

An exemplary radio network controller 36 of one of the radio access networks 34 of the radio network part 14 is further shown to include the apparatus 46 of an embodiment of the present invention. While not separately illustrated, the other radio network controllers of the radio access networks include analogous such apparatus. The elements forming the apparatus 46 are represented functionally. While, in the exemplary implementation, the functions performed by the elements of the apparatus are implemented as algorithms executable at appropriate processing circuitry, in other implementations, the elements are implemented in other manners.

The apparatus 46 here includes an identifier 48 and a RANcast implementer 52. The identifier 48 is operable to identify the number of mobile user endpoints that request, or shall likely request, download of multicast data from the multicast source to the respective endpoints. More particularly, for each cell defined by each base station of a particular radio access network, the identifier identifies how many mobile user endpoints request, or in one implementation are likely to request, download of the multicast data thereto. Responsive to identifications made by the identifier, the RANcast implementer is operable to define a common channel and effectuate downloading of the multicast data to each of the mobile user endpoints that are to receive such data in respective ones of the cells. As decisions are made on a cell-by-cell basis, one, more than one, or none of the cells defined by base stations of a particular radio access network have a common channel allocated for broadcast of the multicast data upon a common channel therein. And, apparatus 46 positioned at the radio network controllers of different ones of the radio access networks separately make identifications and implement RANcast in respective ones of the cells of the respective radio access networks.

In the exemplary implementation, a count is maintained by the identifier of the number of mobile user endpoints within a particular cell that requests the downloading of multicast data thereto. The identifier 48 here is shown to include a counter 54 for performing the count. And, the count is compared by a comparator 56 with a selected threshold. If the count counted by the counter exceeds the selected threshold value, the identifier causes the RANcast implementer to implement the RANcast within the appropriate cell. Separate counts are maintained for each of the cells of the radio access network.

In one implementation, if, during effectuation of a RANcast within a particular cell, the number of mobile user endpoints falls below the selected threshold, or some other value, unicast connections are formed, and the RANcast of the multicast data is terminated. Alternately, a RANcast continues irrespective of the number of mobile user endpoints that continue to receive the RANcast of the multicast data. And, in one implementation, the identifications made by the identifier are based, in part, upon the number of mobile user endpoints that are likely to enter the cell and require the downloading of the multicast data thereto.

Figure 2:
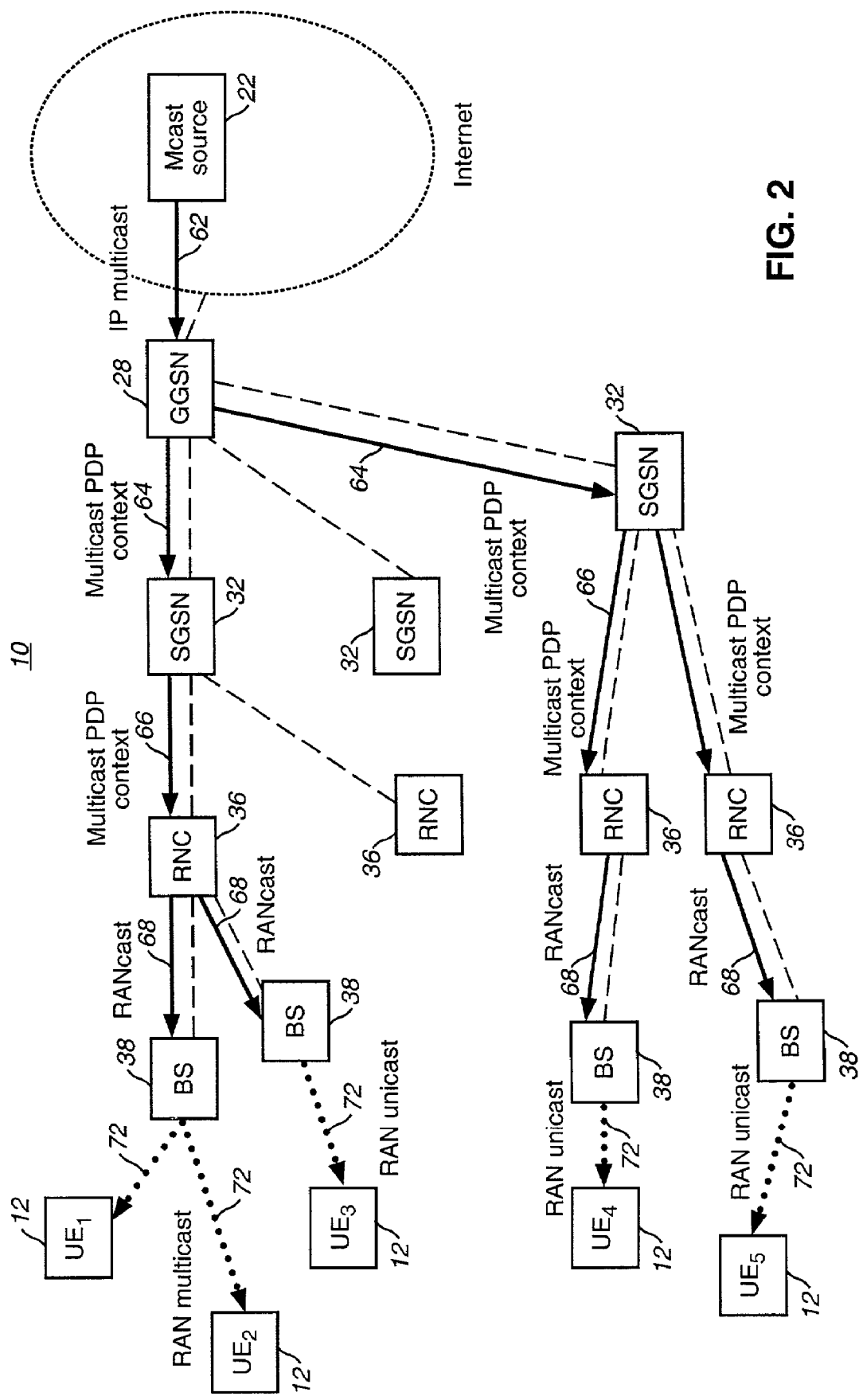
FIG. 2 illustrates a functional representation of portions of the communication system shown in FIG. 1, showing the routing of multicast data during operation of an embodiment of the present invention.

FIG. 2 again illustrates portions of the communication system 10, here to represent the download of multicast data during operation of an embodiment of the present invention. Here, multicast data, originated at the multicast source 22, is generated as IP multicast data, here represented by the arrow 62. The multicast data here is IP-formatted data that is routed to the GGSN 28. The GGSN, in turn, forwards multicast PDP-context data to SGSNs 32 in radio access networks having mobile user endpoints that are to receive the data. Routing of the data from the GGSN to the SGSNs is represented by the arrow 64. The SGSNs, in turn, forward on the multicast PDP-context data to their associated radio network controllers. Forwarding of the data is indicated by the arrows 66. At the radio network controllers, the apparatus of an embodiment of the present invention causes the multicast PDP-context data to be forwarded as a RANcast, indicated by the arrows 68, first to the associated base stations and then to the mobile user endpoints, here indicated by the arrow 72. When the base station broadcasts the multicast data to more than one mobile user endpoint, the broadcast is referred to as a RAN multicast; otherwise, the broadcast is referred to as a RAN unicast. When a RAN multicast is generated a plurality of mobile user endpoints tunes to a common channel, and receives the broadcast of the multicast data thereto as a RANcast. As only a single channel is required to effectuate broadcast of the data to a plurality of mobile user endpoints, radio resources in the cell in which the data is broadcast as a RANcast are efficiently utilized.

Figure 3:
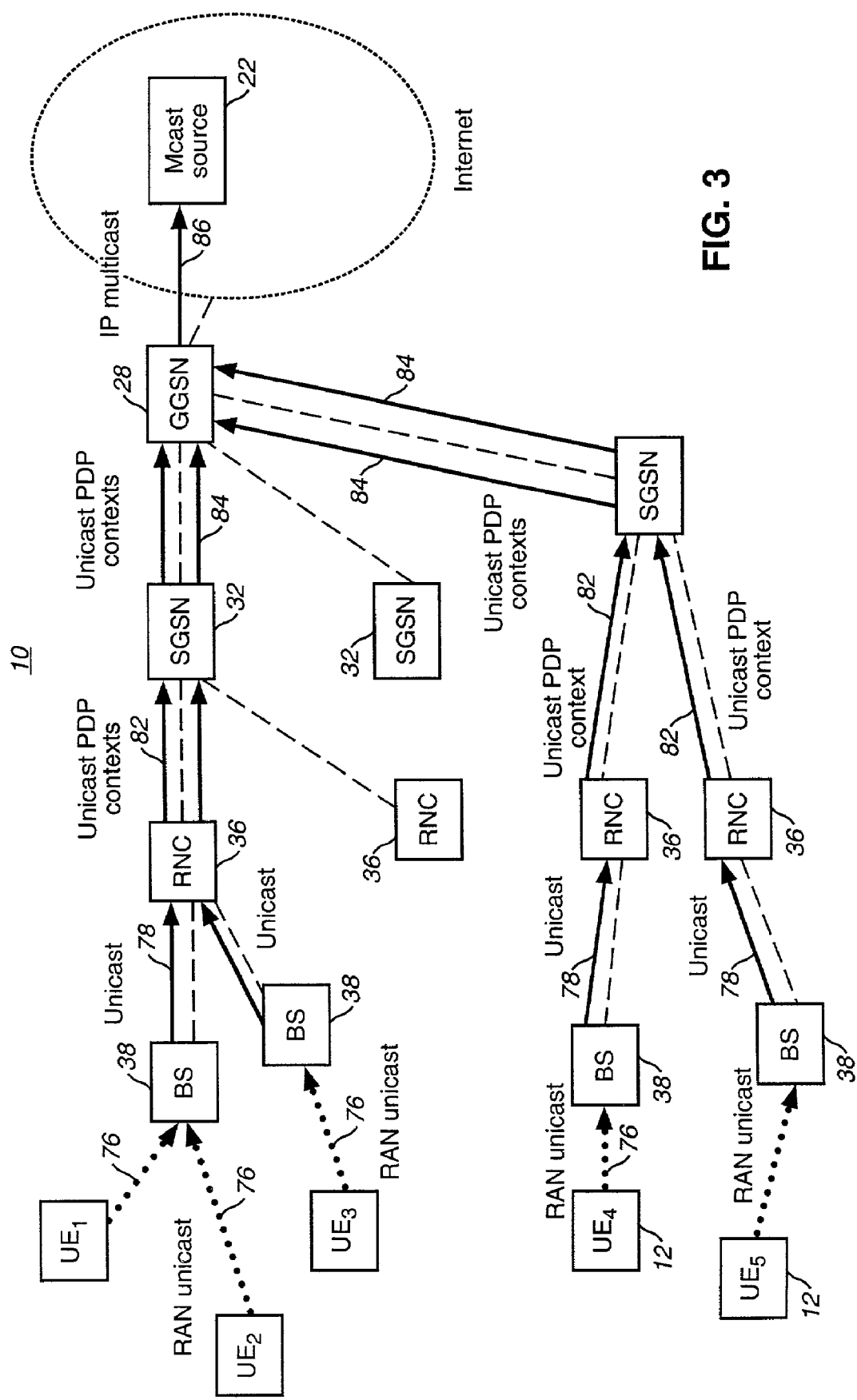
FIG. 3 also illustrates a functional representation, similar to that shown in FIG. 2, here showing the routing of uplink communications generated during operation of an embodiment of the present invention.

FIG. 3 also illustrates portions of the communication system 10, here to represent communication of uplink data pursuant to operation of an embodiment of the present invention. Here, uplink data originated at respective ones of the mobile user endpoints is routed through the respective radio access networks of the radio network part of the communication system to the GGSN 28 thereof. The uplink data is then provided to other use endpoints, either other mobile user endpoints or endpoints coupled to the packet data backbone.

Data originated at the respective ones of the mobile user endpoints are communicated upon radio links as RAN unicast, indicated by the segment 76 to respective ones of the base stations 38. The base stations, in turn, forward on the data in the form of unicasts, indicated by the segment 78 to respective ones of the radio network controllers 36. The radio network controllers forward on the separate unicasts as unicast PDP-context data, indicated by the segments 82 to the SGSNs 32. In turn, the SGSNs forward on the data in the same form, that is, as unicast PDP-context data, indicated by the segments 84, to the GGSN. Here, the GGSN 28 is operable to collect the uplink multicast data and to forward on the data, indicated by the segment 86 as IP multicast data. The data is forwarded by way of the internet 18 and to other user endpoints according to a multicast downlink picture.

Figure 4:
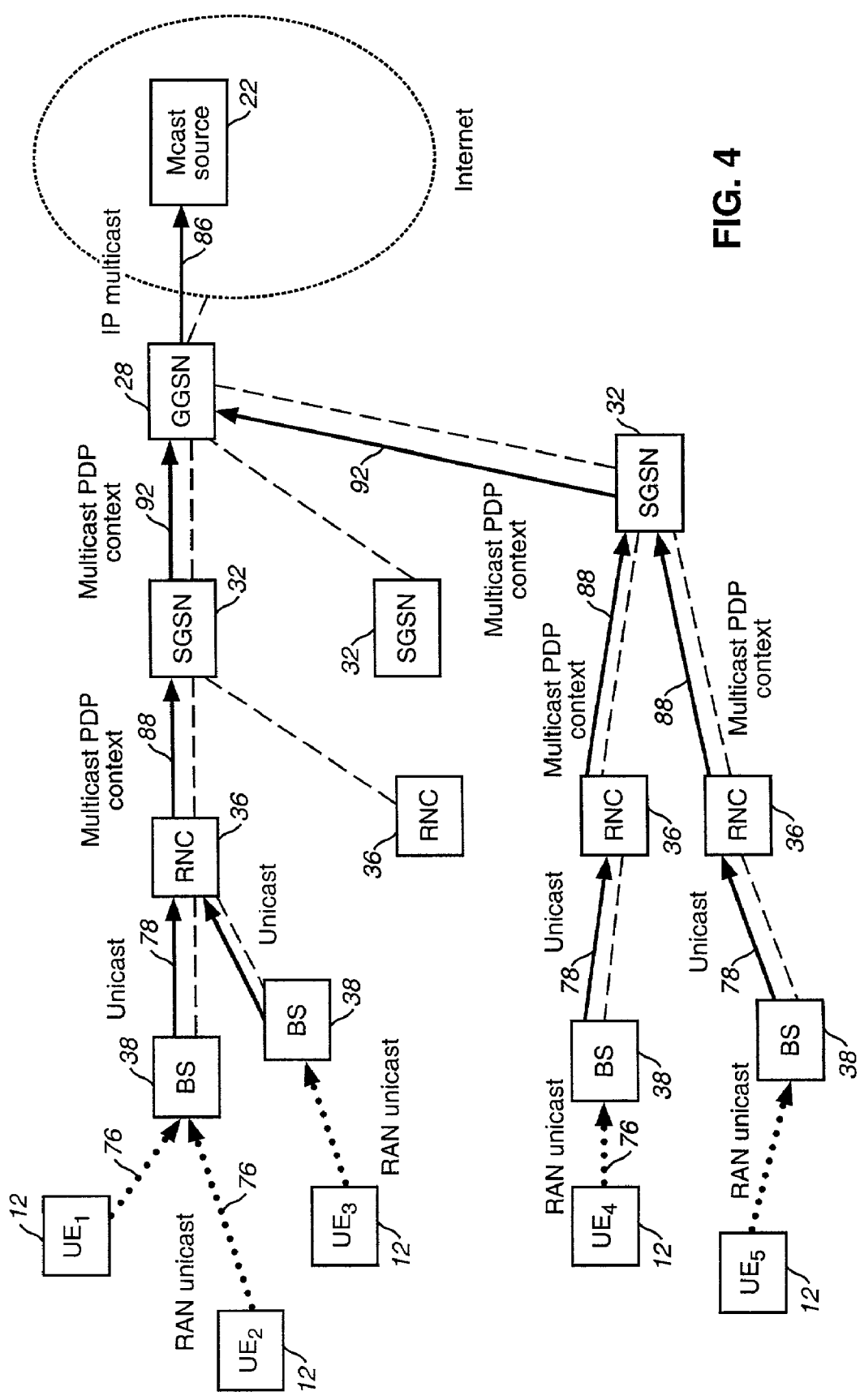
FIG. 4 also illustrates a functional representation, similar to those shown in FIGS. 2 and 3, and here showing the routing of uplink communications generated during operation of another embodiment of the present invention.

FIG. 4 also illustrates portions of the communication system 10, here to represent the routing of uplink data during operation of an alternate embodiment of the present invention. Here, again, data originated at individual ones of the mobile user endpoints 12 are forwarded upon radio links as RAN unicasts, indicated by the segment 76. The base stations, in turn, are forwarded as unicasts, indicated by the segment 78, of the data is forwarded onto the radio network controllers. Here, the radio network controllers 36 forward on the data as multicast PDP-context data, indicated by the segments 88. The SGSNs that receive the PDP-context data forwards on the data, here indicated by the segment 92, to the GGSN 28. And, the GGSN forwards the data as IP multicast data 86.

In this implementation, the RNCs, SGSNs, and the GGSN all collect the uplink multicast data and send the data to neighboring base stations, radio network controllers, and the GGSNs in the same multicast group, as well as to the packet data network 18, all according to the multicast downlink picture.

Figure 5:
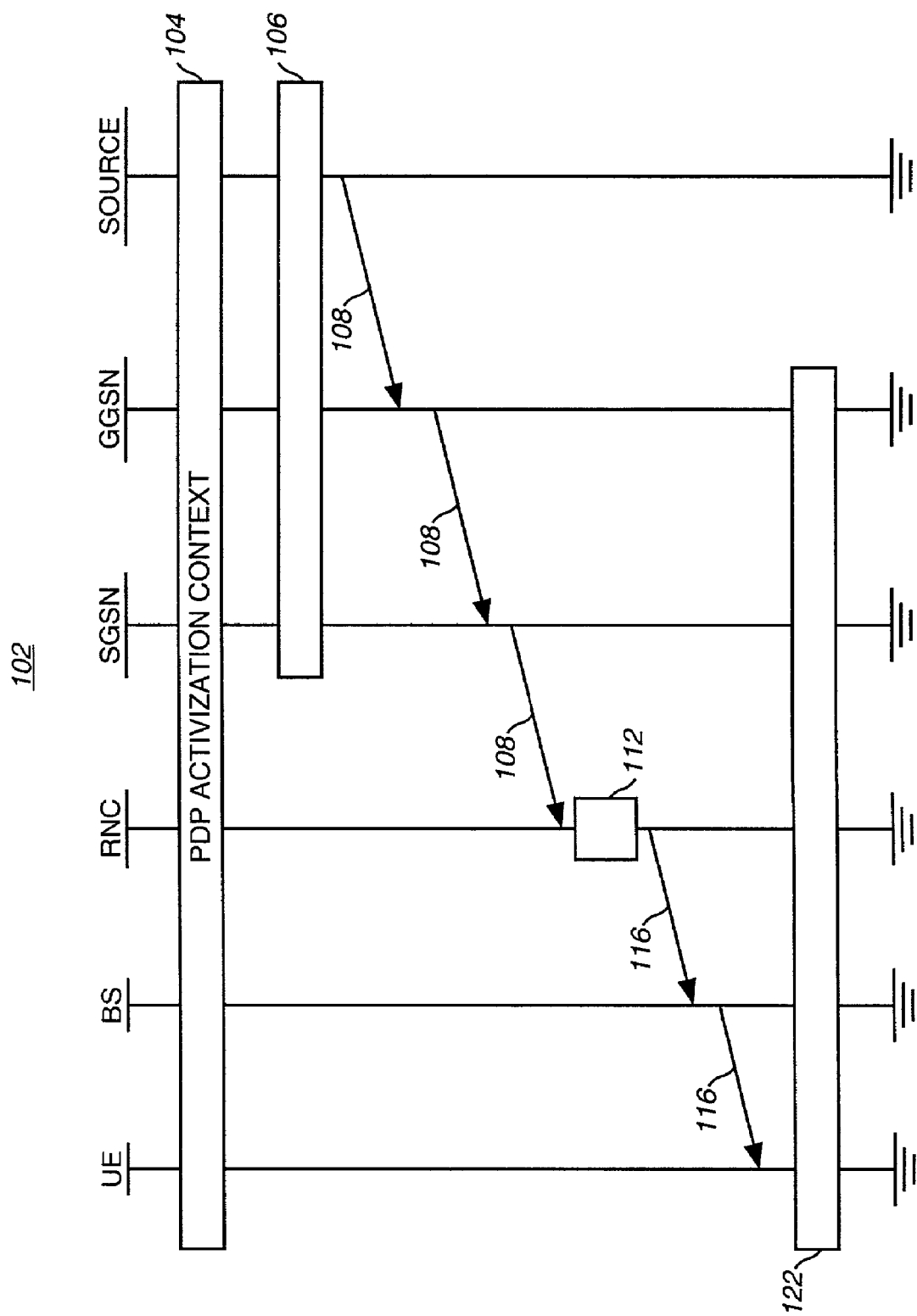
FIG. 5 illustrates a message sequence diagram representative of signaling generated during operation of an embodiment of the present invention.

FIG. 5 illustrates a message sequence diagram, shown generally—as 102, illustrating the signaling generated during operation of the communication system 10. To initiate downloading of the multicast data to a mobile user endpoint, a request is generated by a mobile user endpoint pursuant to a PDP-context activation, here indicated by the block 104. The user endpoint maps the IP multicast group to the identity of its user endpoint-RNC RANcast request to the radio network controller and here defined as a RANcast ID (RANcast identification). Thereby, all mobile user endpoints subscribing to the same multicast group shall use the same RANcast ID and, also, the same IP multicast group. The mobile user endpoint also includes the RANcast identity in the multicast PDP-context activation signaling exchange in order that the RAN, SGSN, and GGSN all shall learn of the identifier. Through knowledge of such value, the elements are able to determine the mapping between the RANcast and a corresponding IP multicast session.

Subsequent to PDP-context activation, the GGSN 28 subscribes, indicated by the block 106, the mobile user endpoint to the corresponding IP multicast group, irrespective of whether the IP-multicast shall be delivered as a unicast to the user endpoint or as a RANcast.

Pursuant to a multicast session activation, the GGSN is required merely to create a single PDP-context for each SGSN that has used the same RANcast identity in the PDP-context activation procedure. Incoming downlink IP multicast packets are copied and sent only once to each SGSN. The SGSN also activates only one downlink PDP-context to each radio network controller involved in the same multicast group. The downlink PDP-context data is again copied and sent only once from the radio network controller to each base station involved in the same multicast group. In the situation in which an IP-RAN is used, multicasting context is sent only once per link. Downlink of the multicast data is indicated in the figure by the segments 108.

At the radio access network, a decision is made pursuant to operation of an embodiment of the present invention whether to communicate the data as a RANcast or a unicast. The determination is indicated here by the block 112. And, responsive to the determination, the multicast data is communicated either pursuant to a RANcast or a unicast to the user endpoint. Such communication is indicated by the segments 116.

In one implementation, the determination is made at the block 112 depending upon the number of user endpoints in a particular cell that are to receive the multicast data. Additionally, a RANcast session which has been activated is stopped when the number of user endpoints in the cell has dropped, or is likely to drop below a selected threshold. A RANcast can, however, continue, if desired, irrespective of the remaining user endpoints that are receiving the RANcast.

The user endpoints receiving the RANcast may also send information to other members of the same RANcast/IP multicast group. Here, uplink communications from a user endpoint receiving a RANcast take place using another user endpoint-individual PDP-context to the GGSN, and the creation of the context is indicated by the block 122 in the figure. The GGSN then forwards the information received from the user endpoint to other members of the same multicast group, including multicast subscribers in the internet according to the IP multicasting standard. Additionally, and as a further enhancement, the uplink data related to a specific RANcast can be already combined at the radio network controller. That is, the radio network controller collects all uplink data from all of the user endpoints subscribed to the same RANcast group and thereafter forwards the data in the uplink direction of the multicast PDP-context to the SGSN, as described in FIG. 4 above. The SGSN also combines the received uplink RAN multicast PDP-context and forwards the data to the GGSN. An alternative to this implementation is to implement a multicast server connection point (MSCP) behind the GGSN. The multicast server connection point is indicated by a specific APN. The benefit provided by an MSCP would be to enable RANcast also in networks in which a GGSN does not support the RANcast functionality. And, when a registered user endpoint moves out of the cell in which it had been registered, normal GPRS procedures are utilized.

Figure 6:
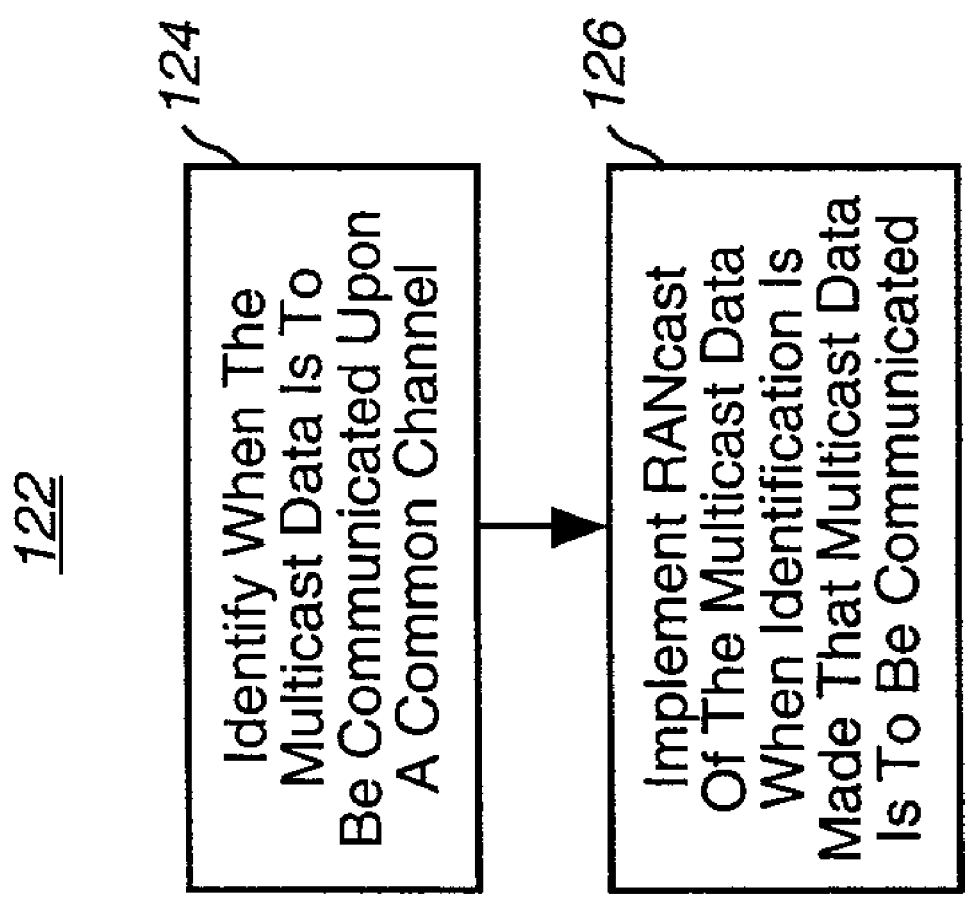
FIG. 6 illustrates a method flow diagram listing the method steps of the method of operation of an embodiment of the present invention.

FIG. 6 illustrates a method flow diagram, shown generally—as 122 listing the method steps of an embodiment of the present invention. The method set forth therein selectably facilitates communication of a multicast data to a first mobile user endpoint and at least a second mobile user endpoint.

First, and as indicated by the block 124, identification is made as to when communication of the multicast data is to be effectuated upon a common channel. The common channel is common to both the first mobile user endpoint and the at least the second mobile user endpoint. Then, and as indicated by the block 126, a RANcast is implemented of the multicast data upon the common channel to the first and at least second mobile stations when identification is made that the communication of the multicast data is to be effectuated upon the common channel.

The preferred descriptions are of preferred examples for implementing the invention, and the scope of the invention should not necessarily be limited by this description. The scope of the present invention is defined by the following claims.

The invention claimed is:

1. In a packet-based multi-user radio communication system in which a data source originates multicast data, an improvement of apparatus for a radio access network (RAN) part of the radio communication system for selectably facilitating communication of the multicast data to a first mobile user endpoint and at least a second mobile user endpoint, said apparatus comprising:
   an identifier positioned at the radio access network, said identifier for identifying when communication of the multicast data is to be effectuated upon a common channel, common to both the first mobile user endpoint and the at least the second mobile user endpoint; and
   a point to multi-point bearer implementer coupled to said identifier, said point to multi-point bearer implementer for implementing a multicast of the multicast data upon the common channel to the first and at least second mobile user endpoint, respectively, when said identifier identifies that the communication of the multicast data is to be effectuated upon the common channel,
   wherein the radio access network defines at least a first cell fanning a corresponding at least first coverage area within which communication with the first and at least second mobile user endpoints, when positioned therein, is effectuable, and wherein said identifier identifies at least when the first and at least second mobile user endpoints are likely to be within the at least the first cell.

2. The apparatus of claim 1 wherein identifications made by said identifier identify when the first and at least second mobile user endpoints are both at least likely to be within the cell and to request the communication of the multicast data thereto.

3. The apparatus of claim 2 wherein the first and at least second mobile user endpoints each generate requests to request communication of the multicast data thereto and wherein said identifier identifies when any of the first and at least second mobile user endpoints requests the communication of the multicast data thereto.

4. The apparatus of claim 3 wherein said identifier further comprises a counter for counting the requests generated by the first and at least second mobile user endpoints for communication of the multicast data thereto and a comparator coupled to the counter to receive indications of a count of the requests counted thereat, said comparator for comparing the count with a threshold value.

5. The apparatus of claim 4 wherein said identifier identifies that the communication of the multicast data is to be effectuated upon the common channel when the count compared by the comparator is beyond the threshold value.

6. The apparatus of claim 3 wherein the requests generated by the fast and at least second mobile user endpoints comprise PDP (Packet Data Protocol) context activation requests.

7. The apparatus of claim 6 wherein the PDP context activation requests generated by the first and at least second mobile user endpoints and identified by said identifier are routed to the data source at which the multicast data is originated, the data source identified by an IP (Internet Protocol) Multicast address, and the multicast data generated by the data source routed to the radio access network pursuant to an IP Multicast.

8. The apparatus of claim 7 wherein said point to multi-point bearer implementer selectably broadcasts the multicast data provided to the radio access network as the IP Multicast as a RANcast upon the common channel.

9. The apparatus of claim 1 wherein the radio access network comprises a radio network controller (RNC) and wherein said identifier and said point to multi-point bearer implementer are embodied at the radio network controller.

10. The apparatus of claim 9 wherein the requests generated by the first and at least second mobile user endpoints and identified by said identifier are generated pursuant to a signaling exchange with the radio network controller.

11. The apparatus of claim 1 wherein the radio access network further comprises a first base transceiver station and at least a second base transceiver station, the first base transceiver station defining the first cell and the at least the second base transceiver station defining at least a second cell, and wherein identifications made by said identifier are made separately for mobile user endpoints at separate ones of the first and at least second cells, respectively.

12. The apparatus of claim 11 wherein said point to multi-point bearer implementer implements the multicast upon the common channel selectably in the first cell and in the at least the second cell responsive to the indications made by said identifier separately at the separate ones of the first and at least second cells.

13. In a packet-based multi-user radio communication system in which a data source originates multicast data, an improvement of apparatus for a radio access network (RAN) part of the radio communication system for selectably facilitating communication of the multicast data to a first mobile user endpoint and at least a second mobile user endpoint, said apparatus comprising:
   an identifier positioned at the radio access network, said identifier for identifying when communication of the multicast data is to be effectuated upon a common channel, common to both the first mobile user endpoint and the at least the second mobile user endpoint; and
   a point to multi-point bearer implementer coupled to said identifier, said point to multi-point bearer implementer for implementing a multicast of the multicast data upon the common channel to the first and at least second mobile user endpoint, respectively, when said identifier identifies that the communication of the multicast data is to be effectuated upon the common channel,
   wherein the multicast data is selectably transmitted as separate unicasts to at least a selected one of the first mobile user endpoint and the at least the second mobile user endpoint and wherein the multicast data is communicated pursuant to the separate unicasts when said identifier fails to identify that the communication of the multicast data is to be effectuated upon the common channel.

14. In a method for communicating in a packet-based multi-user radio communication system in which a data set-vice originates multicast data, an improvement of a method for selectably facilitating communication of the multicast data to a first mobile user endpoint and at least a second mobile user endpoint, said method comprising:

an initial operation, performed selectably by the first and at least second mobile user endpoints, of requesting delivery of the multicast data;

identifying when communication of the multicast data is to be effectuated upon a common channel, the common channel common to both the first mobile user endpoint and the at least the second mobile user endpoint, and implementing a point to multi-point bearer for casting of the multicast data upon the common channel to the first and at least second mobile user endpoint, respectively, when identification is made during said operation of identifying that the communication of the multicast data is to be effectuated upon the common channel.

15. The method of claim 14 wherein said operation of identifying comprises counting the requests generated during said operation of requesting and identifying the communication of the multicast data to be effectuated upon the common channel when the requests counted during said operation of counting exceed a selected threshold.

16. In a method for communicating in a packet-based multi-user radio communication system in which a data service originates multicast data, an improvement of a method for selectably facilitating communication of the multicast data to a first mobile user endpoint and at least a second mobile user endpoint, said method comprising:

identifying when communication of the multicast data is to be effectuated upon a common channel the common channel common to both the first mobile user endpoint and the at least the second mobile user endpoint, and implementing a point to multi-point bearer for casting of the multicast data upon the common channel to the first and at least second mobile user endpoint, respectively, when identification is made during said operation of identifying that the communication of the multicast data is to be effectuated upon the common channel, wherein the radio access network defines at least a first cell forming a corresponding at least first coverage area, and wherein said operation of identifying identifies at least when the first and at least second mobile user endpoints are likely to be within the at least the first cell.

* * * * *

(12) EX PARTE REEXAMINATION CERTIFICATE (8073rd)
United States Patent
Kall et al.

(10) Number: US 7,149,195 C1
(45) Certificate Issued: Mar. 8, 2011

(54) APPARATUS, AND ASSOCIATED METHOD, FOR MULTICASTING DATA IN A RADIO COMMUNICATIONS SYSTEM

(75) Inventors: Jan Kall, Espoo (FI); Patrik Flykt, Helsinki (FI)

(73) Assignee: Nokia Corporation, Espoo (FI)

Reexamination Request:
No. 90/010,052, Jan. 11, 2008

Reexamination Certificate for:
Patent No.: 7,149,195
Issued: Dec. 12, 2006
Appl. No.: 09/998,461
Filed: Nov. 29, 2001

Related U.S. Application Data

(60) Provisional application No. 60/315,750, filed on Aug. 28, 2001.

(51) Int. Cl.
*H04Q 7/00* (2006.01)

(52) U.S. Cl. .................. 370/328; 370/342; 370/352; 370/389; 455/3.02

(58) Field of Classification Search .................. None
See application file for complete search history.

(56) References Cited

U.S. PATENT DOCUMENTS

| | | | |
|---|---|---|---|
| 5,666,360 A | 9/1997 | Chen et al. | 370/390 |
| 6,912,402 B1 | 6/2005 | Haumont et al. | |
| 2002/0036983 A1 * | 3/2002 | Widegren et al. | 370/230.1 |
| 2002/0101859 A1 * | 8/2002 | Maclean | 370/352 |
| 2002/0143951 A1 * | 10/2002 | Khan et al. | 709/227 |
| 2003/0017836 A1 | 1/2003 | Vishnathan et al. | 455/517 |
| 2003/0148779 A1 * | 8/2003 | Aravamudan et al. | 455/519 |
| 2004/0002337 A1 * | 1/2004 | Wheeler et al. | 455/445 |
| 2004/0233883 A1 * | 11/2004 | Ludwig et al. | 370/338 |
| 2005/0152398 A1 * | 7/2005 | Shin | 370/469 |
| 2006/0168301 A1 * | 7/2006 | Chang et al. | 709/231 |
| 2007/0202877 A1 * | 8/2007 | Hogan | 455/436 |

FOREIGN PATENT DOCUMENTS

| | | |
|---|---|---|
| WO | 98/23050 | 5/1998 |
| WO | 98/25422 | 6/1998 |
| WO | 99/52307 | 10/1999 |
| WO | WO 99/59355 | 11/1999 |
| WO | 01/41533 | 6/2001 |

\* cited by examiner

*Primary Examiner*—Charles Craver

(57) ABSTRACT

Apparatus, and an associated method, for facilitating formation of a RANcast in a radio communication system. An identifier identifies when a selected number of mobile user endpoints within a cell of a radio communication system are to receive the same multicast data. When the number exceeds a selected threshold, a RANcast is implemented by a RANcast implementer in which a common channel is used to broadcast the multicast data to all the mobile user endpoints.

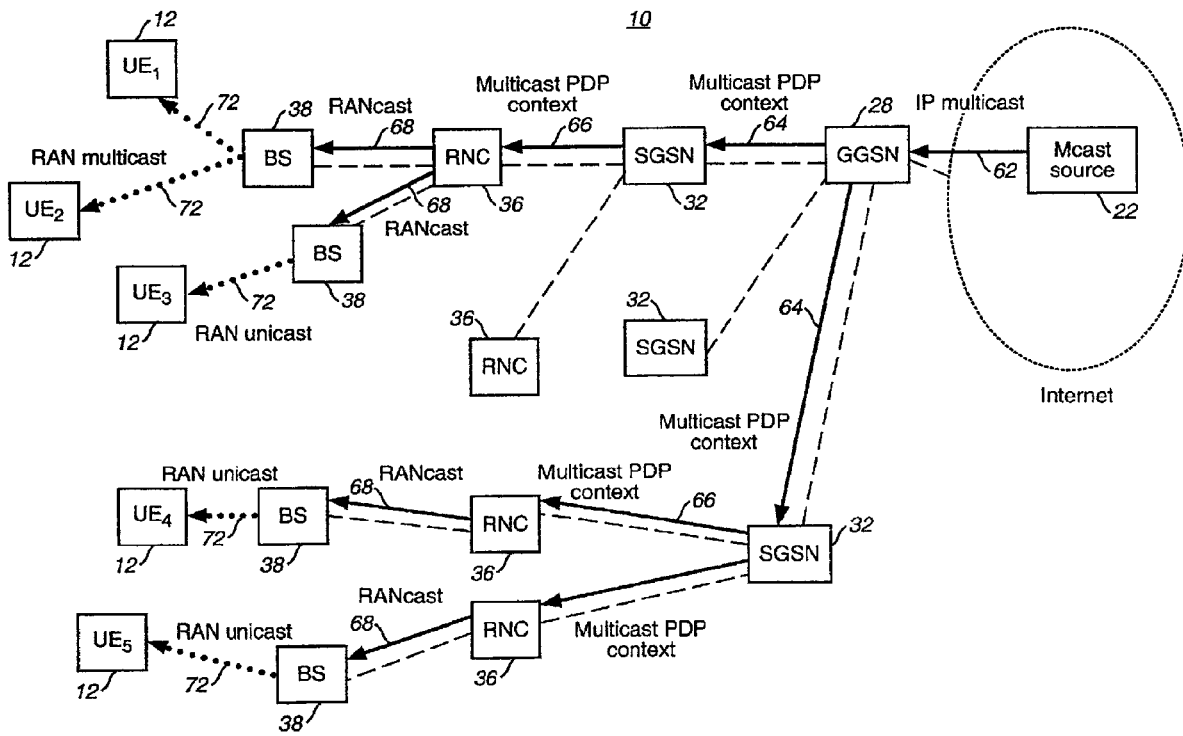

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-12 and 14-16 are cancelled.

Claim 13 is determined to be patentable as amended.

New claims 17-20 are added determined to be patentable.

13. [In a packet-based multi-user radio communication system in which a data source originates multicast data, an improvement of] *An* apparatus [for a radio access network (RAN) part of the radio communication system] for selectably facilitating communication of [the] multicast data to a first mobile user endpoint and at least a second mobile user endpoint *through a radio access network in a packet-based multi-user radio communication system having a source for multicast data in the communication system*, said apparatus comprising:

an identifier positioned at the radio access network, said identifier for identifying when communication of the multicast data is to be effectuated upon a common channel, common to both the first mobile user endpoint and the at least the second mobile user endpoint; and a point to multi-point bearer implementer coupled to said identifier, said point to multi-point bearer implementer for implementing a multicast of the multicast data upon the common channel to the first and at least second mobile user endpoint, respectively, when said identifier identifies that the communication of the multicast data is to be effectuated upon the common channel, wherein the multicast data is selectably transmitted as separated unicasts to at least a selected one of the first mobile user endpoint and the at least the second mobile user endpoint and wherein the multicast data is communicated pursuant to the separated unicasts when said identifier fails to identify that the communication of the multicast data is to be effectuated upon the common channel.

*17. The apparatus of claim 13 wherein the radio access network comprises a radio network controller (RNC) and wherein said identifier and said point to multi-point bearer implementer are embodied at the radio network controller.*

*18. The apparatus of claim 17 wherein the requests generated by the first and at least second mobile user endpoints and identified by said identifier are generated pursuant to a signaling exchange with the radio network controller.*

*19. The apparatus of claim 13 wherein the radio access network further comprises a first base transceiver station and at least a second base transceiver station, the first base transceiver station defining the first cell and the at least the second base transceiver station defining at least a second cell, and wherein identifications made by said identifier are made separately for mobile user endpoints at separate ones of the first and at least second cells, respectively.*

*20. The apparatus of claim 19 wherein said point to multi-point bearer implementer implements the multicast upon the common channel selectably in the first cell and in the at least the second cell responsive to the indications made by said identifier separately at the separate ones of the first and at least second cells.*

\* \* \* \* \*